US009845985B1

(12) United States Patent
Alyanak et al.

(10) Patent No.: US 9,845,985 B1
(45) Date of Patent: Dec. 19, 2017

(54) HOME APPLIANCE DEVICE

(71) Applicant: BSH HAUSGERAETE GMBH, Munich (DE)

(72) Inventors: Altan Alyanak, Istanbul (TR); Fidan Gueler, Istanbul (TR); Emre Guentav, Istanbul (TR)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/337,132

(22) Filed: Oct. 28, 2016

(51) Int. Cl.
| *A47B 96/04* | (2006.01) |
| *F25D 25/02* | (2006.01) |
| *F25D 11/00* | (2006.01) |
| *F16C 29/04* | (2006.01) |
| *F16C 29/08* | (2006.01) |
| *A47B 96/02* | (2006.01) |

(52) U.S. Cl.
CPC .......... *F25D 25/024* (2013.01); *A47B 96/025* (2013.01); *F16C 29/048* (2013.01); *F16C 29/082* (2013.01); *F16C 29/084* (2013.01); *F25D 11/00* (2013.01); *F16C 2362/52* (2013.01)

(58) Field of Classification Search
CPC ...... F25D 25/024; F25D 25/025; F25D 11/00; F16C 29/048; F16C 29/082; F16C 29/084; F16C 2362/52; A47B 2210/02; A47B 96/025
USPC ........................................ 312/402, 404, 408
See application file for complete search history.

(56) References Cited

U.S. PATENT DOCUMENTS

| 1,837,293 | A | * | 12/1931 | Sanford | ................ | F25D 25/024 |
| | | | | | | 126/339 |
| 3,435,575 | A | * | 4/1969 | Pottiez | ............... | A47B 47/0041 |
| | | | | | | 312/108 |
| 4,436,357 | A | * | 3/1984 | Rock | .................... | A47B 88/493 |
| | | | | | | 312/334.12 |
| 7,300,121 | B2 | * | 11/2007 | Diebold | ................. | A47B 73/00 |
| | | | | | | 312/408 |
| 7,406,833 | B2 | * | 8/2008 | Ertz | ...................... | F25D 23/021 |
| | | | | | | 62/115 |
| 7,997,668 | B2 | * | 8/2011 | Lee | ....................... | F25D 25/025 |
| | | | | | | 312/331 |
| 8,002,368 | B2 | * | 8/2011 | Benitsch | ............... | F25D 25/024 |
| | | | | | | 211/153 |
| 8,091,971 | B2 | * | 1/2012 | Ward | ..................... | A47B 88/40 |
| | | | | | | 312/333 |
| 8,469,470 | B2 | * | 6/2013 | Hecht | .................... | A47B 67/04 |
| | | | | | | 312/334.4 |
| 8,490,428 | B2 | * | 7/2013 | Blersch | ................ | F25D 25/024 |
| | | | | | | 62/382 |
| 2010/0019637 | A1 | * | 1/2010 | Guttinger | ............. | A47B 88/493 |
| | | | | | | 312/334.5 |
| 2013/0257253 | A1 | * | 10/2013 | Haltmeyer | ........... | F25D 25/025 |
| | | | | | | 312/404 |

* cited by examiner

*Primary Examiner* — Stanton L Krycinski
*Assistant Examiner* — Timothy M Ayres
(74) *Attorney, Agent, or Firm* — Laurence A. Greenberg; Werner H. Stemer; Ralph E. Locher

(57) ABSTRACT

For the purpose of improving a protective effect of a home appliance device, in particular a home appliance chiller device, is proposed comprising: a telescopic guiding unit, which is convertible at least from a fully contracted state to a fully extracted state and vice versa, and has at least one stationary guiding element; and comprising a cover unit, which at least mostly covers the stationary guiding element at least in the fully extracted state.

15 Claims, 8 Drawing Sheets

HOME APPLIANCE DEVICE

BACKGROUND OF THE INVENTION

Field of the Invention

The invention relates to a home appliance device, in particular a home appliance chiller device.

U.S. Pat. No. 8,490,428 B2 discloses a refrigerator and/or freezer which comprises telescopic guiding units and which has a stationary guiding element. Further, a cover element is disclosed which partly covers the stationary guiding element.

SUMMARY OF THE INVENTION

One object of the invention is, in particular, to provide a generic home appliance device with improved characteristics regarding protection.

With the above and other objects in view there is provided, in accordance with the invention, a telescopic guiding unit configured to be convertible at least from a fully contracted state to a fully extracted state and vice versa and having at least one stationary guiding element; and a cover unit, which at least mostly covers the stationary guiding elemental least in the fully extracted state.

Advantageous implementations and further developments of the invention may be gathered from the dependent claims.

A home appliance device, in particular a home appliance chiller device, is proposed, comprising: a telescopic guiding unit, which is convertible at least from a fully contracted state to a fully extracted state and vice versa and which has at least one stationary guiding element; and comprising a cover unit, which at least mostly covers the stationary guiding element at least in the fully extracted state.

By means of the invention in particular a protective effect of the home appliance device can be improved. The guiding unit may serve as a visual cover which hides the stationary guiding element from view. Advantageously, due to the fact that the cover unit protects the guiding unit from debris and condensed water, which could in particular cause corrosion and/or jamming of the guiding unit, cleanliness as well as a lifetime of the home appliance device may be increased. Furthermore, an operating safety may be improved, in particular as the cover unit prevents a user's limbs from getting caught in the guiding unit.

In this context, the term "configured" is in particular to mean specifically programmed, designed and/or equipped. By an object being configured for a certain function is in particular to be understood that the object implements and/or fulfills said certain function in at least one application state and/or operating state. By a "home appliance device" is in particular to be understood at least a portion, preferably a sub-assembly group, of a home appliance. The home appliance is in particular provided for storing and preferably tempering victuals such as beverages, in particular alcoholic beverages such as wine, meat, fish, vegetables, fruits, milk and/or dairy products in at least one operating state, advantageously for the purpose of enhancing a quality and/or a keep ability of the stored victuals. The home appliance may be embodied as a home chiller appliance, which is in at least one operating state configured for cooling victuals. The home chiller appliance may in particular be embodied as a climate cabinet, an ice-box, a refrigerator, a freezer and/or a refrigerator-freezer combination. The home chiller appliance may be embodied as a wine cooler. The home appliance may also be embodied as a home appliance for warming up and in particular for cooking victuals, e.g. an oven, a steamer and/or a microwave. The home appliance device may in particular further comprise an insert and preferably an inner liner.

The guiding unit is in particular configured for extraction and/or contraction of the insert out of and/or into the inner liner. The guiding unit may in particular be fixable, or detachably fixable, in the fully extracted state and/or the fully contracted state. In particular in between the fully extracted state and/or the fully contracted state the guiding unit may be configured for allowing a sliding motion of the insert with respect to the inner liner. In particular during extraction and/or contraction of the guiding unit, the stationary guiding element of the guiding unit stays in place and may be coupled to the inner liner. In this context, "coupled" is in particular to mean at least indirectly or directly attached, fixed and/or connected. For example, in the fully extracted state a main extension of the guiding unit is longer than a main extension of the guiding unit in the fully contracted state, in particular by at least 50%, or at least 65%, or at least 80% or at least 95% than a main extension of the guiding unit in the fully contracted state. A "main extension" of an object is, in particular, to be understood, in this context, as a longest side of an imaginary rectangular cuboid which only just entirely encloses the object. In this context "convertible" is in particular to mean extractable, in particular repeatably extractable, or in an extraction direction, or in addition contractible in a contraction direction. The extraction direction and the contraction direction may be in particular antiparallel directions and extend in particular at least substantially parallel to the main extension of the guiding unit or in addition at least substantially parallel to a horizontal plane of the home appliance device, advantageously regardless of the state of the guiding unit. In this context, a "horizontal plane" is in particular to be understood as a main extension plane of a base onto which the home appliance device is installed in an installation position. A "main extension plane" of an object is, in particular, to be understood as a plane extending parallel to a largest side of an imaginary rectangular cuboid which only just entirely encloses the object or in addition extends through a geometric center of the object. In this context "at least substantially parallel" is in particular to be understood as an orientation of a direction with respect to a reference direction, in particular in a plane, wherein the direction and the reference direction include an angle of 0°, the orientation in particular having a deviation of less than 15°, or of less than 10° or of less than 2°.

The insert is in particular configured for storage of victuals. The insert may in particular be implemented as a shelf, or an at least partly transparent shelf, e.g. made of glass and/or of a transparent plastic, as a cover for a drawer, which is in particular configured for adjusting humidity in the drawer, and/or as a dividing plate, which in an installation position may divide a storage space into at least two storage areas. For example, the insert may be implemented as a bottle holder. In this context a "bottle holder" is in particular to be understood as a shelf which is configured for depositing bottles. For example, the insert comprises a frame and at least two elongate deposit elements, which are fixed to the frame and are arranged offset to each other in a direction at least substantially perpendicular to a main extension direction of the deposit elements. In particular at least two deposit elements may be configured for storage of at least one bottle. In this context "at least substantially perpendicular" is in particular to be understood as an orientation of a direction with respect to a reference direction, in particular in a plane, wherein the direction and the reference direction form an angle of 90° and in particular having a deviation of less than 15°, or of less than 10° or of less than 2°. The deposit elements may be implemented as slats and/or rods. For example, the deposit elements are made of wood. Additionally or alternatively the insert may comprise a profile which is at least partly shaped corresponding to a contour of a bottle.

The cover unit may be in particular implemented separate from the guiding unit. For example, the cover unit may be at least partly implemented integrally with the inner liner and/or the insert. In this context, the term "a first object and a second object being at least partly implemented integrally" is in particular to mean that at least one component of the first object and at least one component of the second object are implemented integrally with each other. "Implemented integrally" is in particular to mean, in this context, connected at least by substance-to-substance bond, e.g. by a welding process, an adhesive bonding, an injection-molding process and/or by another process that is deemed expedient by a person having ordinary skill in the art. For example, "implemented integrally" could in particular mean made of one piece. "Made of one piece" is, in particular, to mean, in this context, manufactured from one single piece, e.g. by production from one single cast and/or by manufacturing in a one-component or multi-component injection-molding process, or from a single blank.

In this context, the term "a first object at least partly covering a second object" is in particular to mean that the first object covers and/or encloses the second object from at least one side, or from at least two sides, or from at least three sides or from at least four sides. In particular in at least one viewing direction the second object, or a surface area of the second object, is at least partly arranged or hidden behind the first object, wherein in particular the surface area has a normal vector which is at least substantially parallel to the viewing direction. In particular, viewed in a direction at least substantially perpendicular to the extraction direction and/or to the contraction direction, the cover unit at least mostly covers the stationary guiding element in the fully extracted state. The term "at least mostly" with reference to an object is in particular to mean by more than 50%, or more than 65%, or more than 80% or more than 95% of an object, in particular a surface area, or a volume and/or a mass of the object.

Further, the cover unit may comprise a first cover element and a second cover element, which are movably coupled to each other by the guiding unit, in particular in a direction at least substantially parallel to the extraction and/or contraction direction. In this context, the term "a first object and a second object being movably coupled" is in particular to mean that the first object and the second object are at least indirectly attached, connected and/or fixed to each other and movable with respect to each other or in addition in at least one direction, or in precisely one direction. The first cover element is in particular implemented as a stationary cover element. The first cover element is in particular coupled to the inner liner. The second cover element is in particular implemented as a movable cover element, which is in particular movable with respect to the first cover element. As a result, in particular, the cover unit can be moved alongside the guiding unit such that the guiding unit is constantly covered by the cover unit, in particular regardless of the extraction or contraction state of the guiding unit.

For the purpose of effectively arranging the first cover element and the second cover element in the contracted state in such a way that a construction-space can be reduced, it is proposed that the first cover element and the second cover element at least partly, or at least mostly or entirely, overlap in the fully contracted state, in particular viewed in a direction at least substantially perpendicular to the extraction and/or contraction direction. In this context, the term "a first object and a second object at least partly overlapping" is in particular to mean that the objects cover each other at least partly, and that they extend at least partly, or at least mostly and or entirely, at least substantially parallel to each other.

In particular in the fully extracted state it is conceivable that the first cover element and the second cover element are arranged consecutively. Further, the first cover element and the second cover element may at least partly, or at most minorly overlap in the fully extracted state, in particular viewed in a direction at least substantially perpendicular to the extraction direction and/or the contraction direction. The term "at most minorly" with reference to an object is in particular to mean by less than 50%, or less than 35%, or less than 20% or less than 5% of the object, in particular of a surface area, of a volume and/or of a mass of the object. As a result, a cleanliness of the cover unit can be improved as debris and condensed water can be prevented from entering between the first cover element and the second cover element. For example, an effective arrangement of the first cover element and the second cover element, in particular in the fully extracted state of the guiding unit, can be achieved such that no additional material is required, which reduces costs.

Further, the second cover element may at least partly enclose the first cover element from at least one side, in particular a first side, a second side, a third side and/or a fourth side, at least in the fully contracted state and in particular in the fully contracted state. In this context, the term "a first object being enclosed by a second object from at least one side" is in particular to mean that the first object is at least partly surrounded or closed off by the second object from the at least one side. For example, a straight line which originates in the second object and which is in particular at least substantially parallel to the side and/or consecutively crosses the first object and then extends into the second object. In this context, a "side" is in particular to be understood as a spatial plane which extends at least substantially parallel the extraction direction and/or the contraction direction. The first side is in particular at least substantially parallel to the horizontal plane. The second side is in particular at least perpendicular to the horizontal plane. The third side is in particular at least substantially parallel to the horizontal plane. The fourth side is in particular at least substantially perpendicular to the horizontal plane. The first side and the third side are in particular opposite sides. The second side and the fourth side are in particular opposite sides. As a result a protective effect of the cover unit can be further enhanced.

In addition, it is proposed that the second cover element at least partly engages into the first cover element from at least one side, in particular the first side, the second side, the third side and/or the fourth side, in the fully contracted state. The second cover element engages into the first cover element in particular from the same side from which the first cover element is at least partly enclosed by the second cover element. In this context, the term "a first object at least partly engaging into a second object from at least one side" is in particular to mean that the second object delimits a receiving region into which the first object at least partly extends, in particular in a direction at least substantially perpendicular to the side from which the first object extends into the second object. As a result, in particular an interaction between the first cover element and the second cover element can be achieved in a simple manner. Furthermore, in this way the cover unit may be coupled to the guiding unit in a simple manner.

For the purpose of improving a protective effect and a cleanliness of the guiding unit in the fully extracted state, it is proposed that the first cover element and the second cover element together at least mostly cover the guiding unit from at least one side, in particular the first side, the second side, the third side and/or the fourth side, in the fully extracted state. In particular, the first cover element and the second cover element together at least mostly cover the guiding unit from the same side from which the first cover element is also at least partly enclosed by the second cover element.

Furthermore, it is proposed that the first cover element encloses the guiding unit from at least three sides, in particular the first side, the second side, the third side and/or the fourth side, viewed along the extraction direction of the guiding unit. As a result, the guiding unit can in particular be protected at least partly by the first cover element.

For example, the first cover element may have a cross-section which is at least substantially spiral-shaped, in particular viewed along the extraction direction. In this context, an "at least substantially spiral-shaped object" is to be understood as an object which revolves around a center point at least section-wise, in particular in straight consecutive sections that include angles with each other, and which may converge into the center point, wherein the center point is in particular a geometric center point of the object. In particular, consecutive sections include an angle of more than 0°, or more than 30°, or more than 60°, and/or in particular less than 180°, or less than 150°, or at most 120°. According to one embodiment, consecutive sections are arranged at least substantially perpendicular to each other. The at least substantially spiral-shaped object comprises in particular at least four, or at least five, or precisely five, consecutive sections. In this way, the first cover element can be implemented in a simple manner.

Further, it may be proposed that the first cover element has a cross-section which is at least substantially u-shaped, in particular viewed along the extraction direction. In this context, an "at least substantially u-shaped object" is to be understood as an object which revolves around a center point at least section-wise, in particular in straight consecutive sections that include angles with each other, wherein the center point is in particular a geometric center point of the object. In particular, consecutive sections include angles of more than 0°, or more than 30°, or more than 60°, and/or less than 180°, or less than 150°, or at most 120°. For example, consecutive sections may be arranged at least substantially perpendicular to each other. The at least substantially u-shaped object comprises in particular at least three, or precisely three, consecutive sections of this kind. In this way, the first cover element can be implemented in a simple manner.

It is also proposed that the second cover element encloses the guiding unit from at least one side, in particular the first side, the second side, the third side and/or the fourth side, viewed along an extraction direction of the guiding unit. The second cover element has a cross-section which is at least partly at least substantially u-shaped, in particular viewed along the extraction direction. As a result, the guiding unit can in particular be protected at least partly by the second cover element.

It is further proposed that the guiding unit comprises at least one movable guiding element, which is movably coupled to the stationary guiding element, wherein the first cover element is coupled to the stationary guiding element and the second cover element is coupled to the movable guiding element. The first cover element may in particular be fixed to the stationary guiding element in a force-fit and/or form-fit manner. The second cover element may in particular be fixed to the movable guiding element in a force-fit and/or form-fit manner. By the term "fixed in a force-fit and/or form-fit manner" is in particular to be understood releasably connected, wherein a holding force between two structural components is transferred via a geometric engagement of the structural components with each other, and/or via a friction force acting between the structural components. Alternatively or additionally a fixation may be provided by a substance-to-substance bond, an adhesive and/or cohesive connection. The guiding unit may comprise in particular at least one further movable guiding element, which may couple the movable guiding element to the stationary guiding element. The further movable guiding element may be in particular arranged at least partly between the stationary guiding element and the movable guiding element. Alternatively, the movable guiding element and the stationary guiding element may be coupled to each other directly. The guiding elements may be in particular implemented as guiding rails. It is conceivable that the first cover element may be coupled to the movable guiding element and that the second cover element may be coupled to the stationary guiding element. As a result, a movement of the guiding unit may be transferred to the cover unit such that the cover unit protects the guiding unit in each state.

In addition, the first cover element may be configured for coupling with an inner liner, in particular the before-mentioned inner liner, and the second cover element may be configured for coupling with the insert, in particular the before-mentioned insert. For example, the first cover element may be fixed to the inner liner in a force-fit and/or form-fit manner. It is also conceivable that the first cover element may be at least partly integrally implemented with the inner liner, or in addition with a lateral wall of the inner liner. The second cover element may be in particular coupled to the insert. For example, the second cover element may be fixed to the insert in a force-fit and/or form-fit manner. It is also conceivable that the first cover element may be at least partly implemented integrally with the insert, in particular with the frame of the insert. Alternatively, the first cover element may be configured for coupling with the inner liner and the second cover element may be configured for coupling with the insert. As a result, the guiding unit may move the insert into and out of the inner liner while being continuously protected by the cover unit.

The first cover element may in particular comprise a first wall section, by means of which the first cover element is configured to be coupled to the inner liner, and by means of which the first cover element is coupled to the guiding unit, wherein in particular the inner liner and the guiding unit are attached to sides of the first wall section which face in opposite directions. In order to improve a stability of the coupling between the guiding unit and the cover unit, in one example the first cover element may have a first wall section, by means of which the first cover element may be configured to be coupled to the inner liner, and has a second wall section, by means of which the first cover element may be coupled to the guiding unit, wherein the first wall section and the second wall section are arranged opposite each other. The inner liner and the guiding unit may be in particular attached to sides of the first wall section, respectively the second wall section, which face in the same direction.

For the purpose of improving a functionality of the home appliance device, it may be proposed that the home appliance device comprises an insert, in particular the beforementioned insert, which may be embodied as a bottle holder and may be coupled to the guiding unit.

Herein the home appliance device may be not to be limited to the application and implementation described above. In particular, for the purpose of fulfilling a functionality herein described, the home appliance device may comprise a number of respective elements, structural components and units that differs from the number mentioned herein. Furthermore, regarding the value ranges mentioned in this disclosure, values within the limits mentioned are to be understood to be also disclosed and to be used as applicable.

Further advantages may become apparent from the following description of the drawing. In the drawing exemplary embodiments of the invention are shown. The drawing, the description and the claims contain a plurality of features in combination. The person having ordinary skill in the art will purposefully also consider the features separately and will find further expedient combinations.

Although the invention is illustrated and described herein as embodied in a home appliance device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

If there is more than one specimen of a certain object, only one of these is given a reference numeral in the figures and in the description. The description of this specimen may be correspondingly transferred to the other specimens of the object.

DETAILED DESCRIPTION OF THE INVENTION

Figure 1:
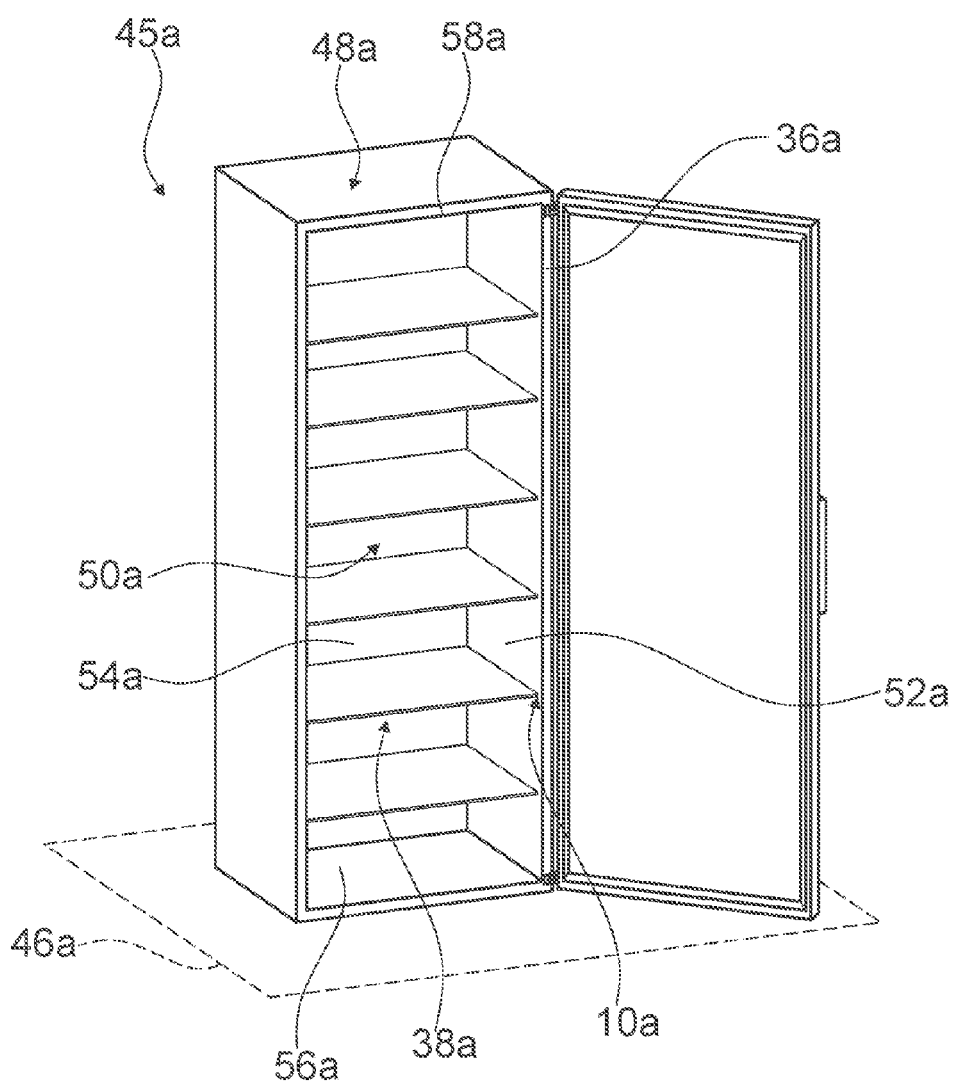
FIG. 1 is a schematic front view of a home appliance comprising a home appliance device according to the invention, FIG. 2 a portion of the home appliance device, comprising a guiding unit in a contracted state, an insert and a cover unit, in a perspective view, FIG. 3 a portion of the home appliance device, comprising the guiding unit in an extracted state, the insert and the cover unit, in a perspective view, FIG. 4 the guiding unit and a portion of the cover unit comprising a first cover element, in a perspective view, FIG. 5 a portion of the cover unit, comprising a second cover element, in a perspective view, FIG. 6 a portion of the home appliance device, comprising the cover unit and the guiding unit, in cross-sectional view, FIGS. 7-9 further embodiments of a home appliance device comprising a cover unit in a schematic cross-sectional view, and FIG. 10 another embodiment of a home appliance device, comprising a cover unit and a guiding unit, in a cross-sectional view.

FIG. 1 shows a home appliance 45a comprising a home appliance device, in a schematic perspective view. The home appliance 45a is embodied as a wine cooler. The home appliance 45a could further be embodied as a refrigerator, a climate cabinet, an ice-box, a freezer and/or a refrigerator-freezer combination.

In FIG. 1 the home appliance device is shown in an installation position. The home appliance device is installed on a base. The base defines a horizontal plane 46a. The home appliance device comprises a housing 48a. The housing 48a is installed upright on the base. The home appliance device comprises an inner liner 36a. The inner liner 36a is arranged inside the housing 48a. The inner liner 36a defines a storage space 50a. The inner liner 36a comprises walls 52a, 54a, 56a, 58a, which delimit the storage space 50a. The inner liner 36a has two lateral walls 52a, or in addition opposite each other. The inner liner 36a has a rear wall 54a. The inner liner 36a has a bottom wall 56a. The inner liner 36a has a top wall 58a, or in addition opposite the bottom wall 56a.

The home appliance device comprises at least one insert 38a. In the present case the home appliance device comprises six inserts 38a. It is conceivable that the home appliance device may comprise a deviating number of inserts 38a as deemed advantageous by someone skilled in the art. The insert 38a is embodied as a bottle holder. The home appliance device may comprise a combination of different embodiments of inserts, for example at least one insert embodied as a shelf and at least one further insert embodied as a bottle holder. For the sake of clarity, in the following only one insert 38a is given a reference numeral and is described in detail. The following description may be transferred to further inserts accordingly.

The insert 38a is configured for depositing bottles. The insert 38a comprises a frame 60a. The insert 38a comprises at least two elongate deposit elements 62a. The deposit elements 62a are fixed to the frame 60a. The deposit elements 62a are arranged offset to each other in a direction at least substantially perpendicular to a main extension direction of the deposit elements 62a. The deposit elements 62a are implemented as slats and/or rods. The deposit elements 62a are made of wood. Alternatively or additionally the insert 38a may comprise a profile which is at least partly shaped corresponding to a contour of a bottle. The insert 38a is coupled to a guiding unit 10a of the home appliance device.

Figure 2:
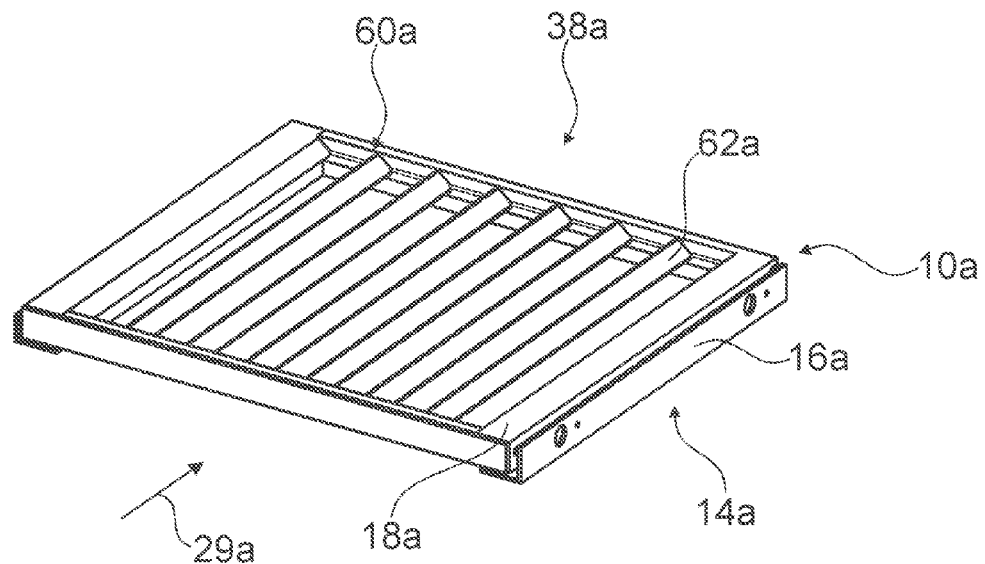

FIG. 2 shows a portion of the home appliance device comprising the guiding unit 10a. In the present case the home appliance device comprises at least two guiding units 10a, in particular for each insert 38a. The home appliance device comprises one guiding unit 10a for each lateral wall 52a of the inner liner 36a and/or for each lateral side of the insert 38a. For the sake of clarity, in the following only one guiding unit 10a is given a reference numeral and is described in detail. The following description can be transferred to further guiding units accordingly.

Figure 3:
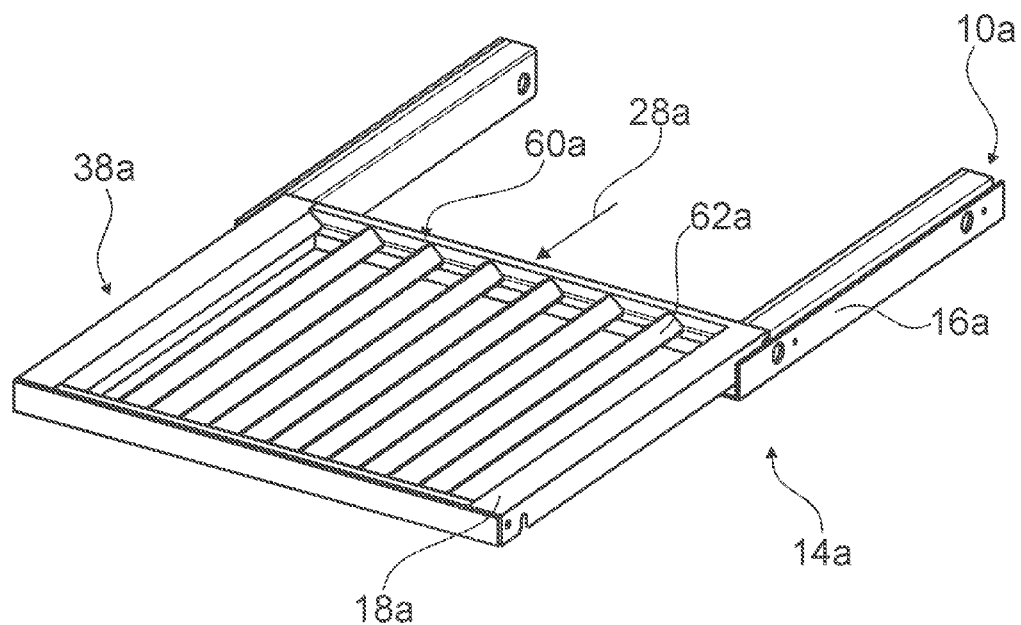
Figure 4:
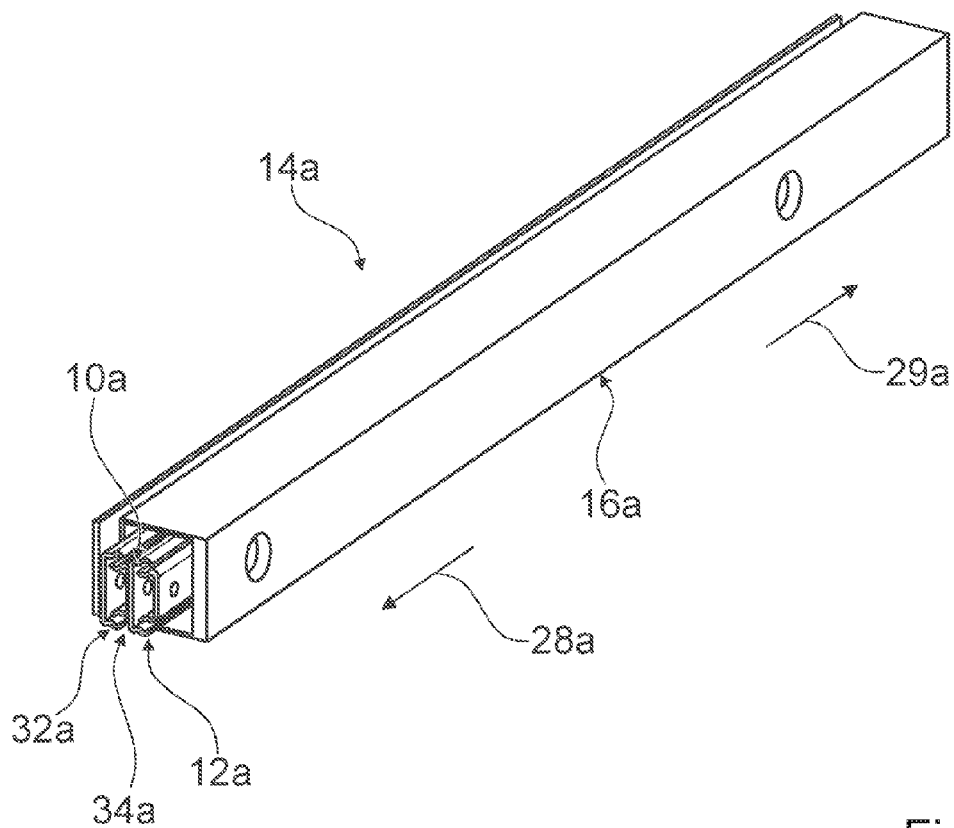

The guiding unit 10a is a telescopic guiding unit. The guiding unit 10a is configured for extraction and/or contraction of the insert 38a out of and/or into the inner liner 36a. The guiding unit 10a is convertible at least from a fully contracted state to a fully extracted state and vice versa. In FIG. 2 the guiding unit 10a is shown in the fully contracted state. In FIG. 3 the guiding unit 10a is shown in the fully extracted state. The guiding unit 10a may be mechanically fixable in the fully extracted state and/or the fully contracted state. The insert 38a is slidable between the fully contracted ad the fully extracted states by means of the guiding unit 10a. The guiding unit 10a is extractable in an extraction direction 28a. The extraction direction 28a is at least substantially parallel to a main extension of the guiding unit 10a and in particular at least substantially parallel to the horizontal plane 46a. The guiding unit 10a is contractible in a contraction direction 29a. The extraction direction 28a and the contraction direction 29a are antiparallel directions. A main extension of the guiding unit 10a in the fully extracted state is longer than a main extension of the guiding unit 10a in the fully contracted state. In the present case the main extension of the guiding unit 10a in the fully extracted state is by at least 95% longer than the main extension of the guiding unit 10a in the fully contracted state.

The guiding unit 10a has at least one stationary guiding element 12a. The stationary guiding element 12a is indirectly coupled to the inner liner 36a. The guiding unit 10a comprises at least one movable guiding element 32a. The movable guiding element 32a is indirectly coupled to the insert. Further, the movable guiding element 32a is movably coupled to the stationary guiding element 12a. The movable guiding element 32a is movable with respect to the stationary guiding element 12a. The guiding unit 10a comprises at least one further movable guiding element 34a. The further movable guiding element 34a couples the movable guiding element 32a to the stationary guiding element 12a. The further movable guiding element 34a is arranged at least partly between the stationary guiding element 12a and the movable guiding element 32a. The guiding elements 12a, 32a, 34a are supported movably with respect to each other by bearing elements 70a. The bearing elements 70a may be implemented as ball bearings. Alternatively, the movable guiding element 32a and the stationary guiding element 12a may in particular be coupled to each other directly. It is conceivable that the home appliance device may comprise a deviating number of guiding elements 12a, 32a, 34a as deemed advantageous by someone skilled in the art.

The home appliance device comprises at least one cover unit 14a. In the present case the home appliance device comprises at least two cover units 14a, in particular one for each guiding unit 10a. For the sake of clarity, in the following only one cover unit 14a is given a reference numeral and is described in detail. The following description can be transferred to further cover units accordingly. The cover unit 14a at least mostly covers the stationary guiding element 12a at least in the fully extracted state.

The cover unit 14a comprises a first cover element 16a. The first cover element 16a is coupled with the inner liner 36a. The first cover element 16a comprises a first wall section 40a. By means of the first wall section 40a, the first cover element 16a is coupled to the inner liner 36a. The first cover element 16a is connected to the lateral wall 52a of the inner liner 36a in a force-fit and/or form-fit manner. Alternatively the first cover element 16a may be implemented integrally with the inner liner 36a, in particular with the lateral wall 52a. The first cover element 16a is coupled to the guiding unit 10a, preferably to the stationary guiding element 12a. The first cover element 16a comprises a second wall section 42a. By means of the second wall section 42a, the first cover element 16a is coupled to the guiding unit 10a. The first wall section 40a and the second wall section 42a are arranged opposite each other. Alternatively, the first cover element 16a may be coupled to the inner liner 36a and the guiding unit 10a by means of only one wall section, in particular the first wall section 40a.

Figure 6:
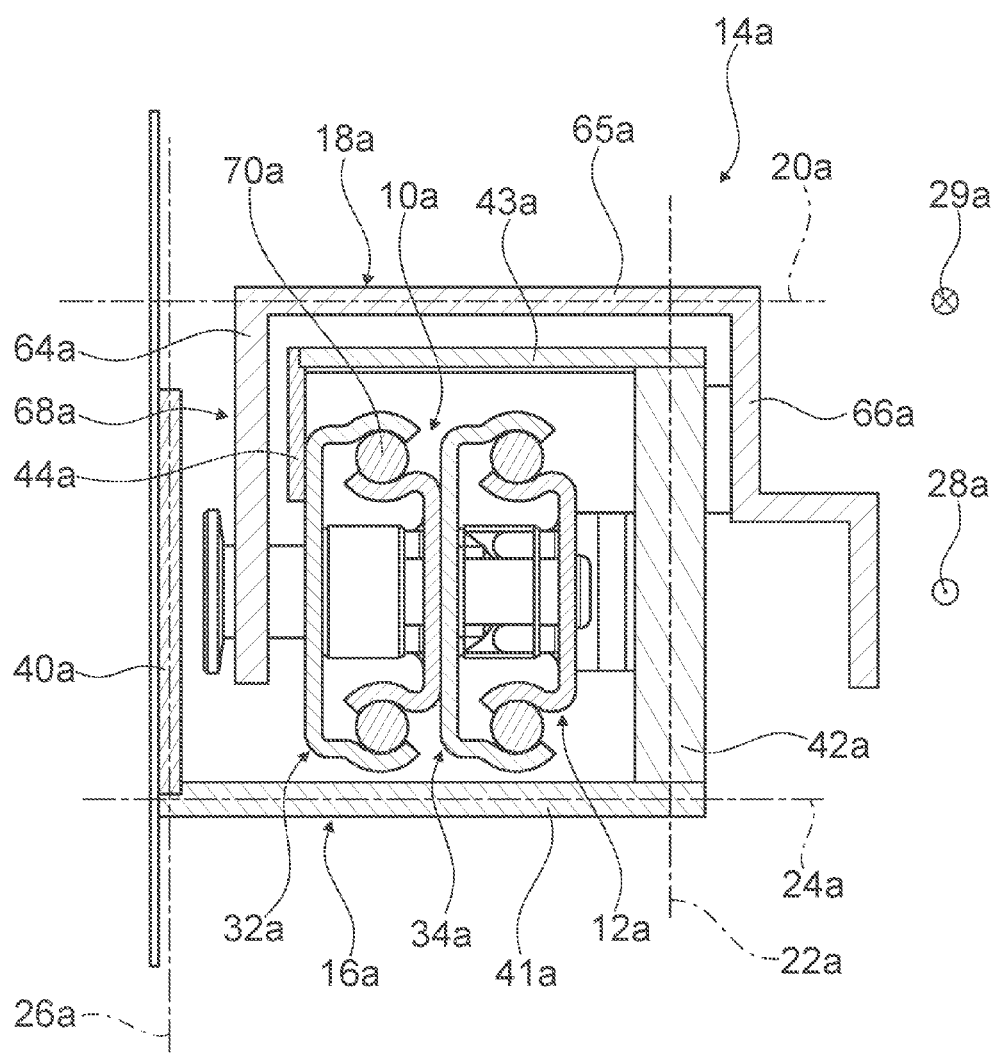

Viewed along the extraction direction 28a, the first cover element 16a covers and/or encloses the guiding unit 10a, in particular the stationary guiding element 12a at least in the fully extracted state, from at least three sides 22a, 24a, 26a, namely a first side 22a, a second side 24a, and a third side 26a (see FIG. 6). The first side 22a is at least substantially perpendicular to the horizontal plane 46a. The second side 24a is at least substantially parallel to the horizontal plane 46a. The third side 26a is at least substantially perpendicular to the horizontal plane 46a. The first side 22a and the third side 26a are situated opposite each other. Additionally or alternatively the first cover element 16a may enclose the guiding unit 10a, in particular the stationary guiding element 12a at least in the fully extracted state, from four sides 20a, 22a, 24a, 26a. In this case the fourth side 20a would in particular be at least substantially parallel to the horizontal plane 46a. Furthermore, the second side 24a and the fourth side 20a would in particular be situated opposite each other. The first cover element 16a has a cross-section which is at least substantially spiral-shaped. The first cover element 16a comprises five consecutive wall sections 40a, 41a, 42a, 43a, 44a. The consecutive wall sections 40a, 41a, 42a, 43a, 44a are straight. The consecutive wall sections 40a, 41a, 42a, 43a, 44a are connected to each other. Respectively two consecutive wall sections 40a, 41a, 42a, 43a, 44a include an angle of 90°. The consecutive wall sections 40a, 41a, 42a, 43a, 44a converge into a center point. The center point is the geometric center point of the first cover element 16a.

Figure 5:
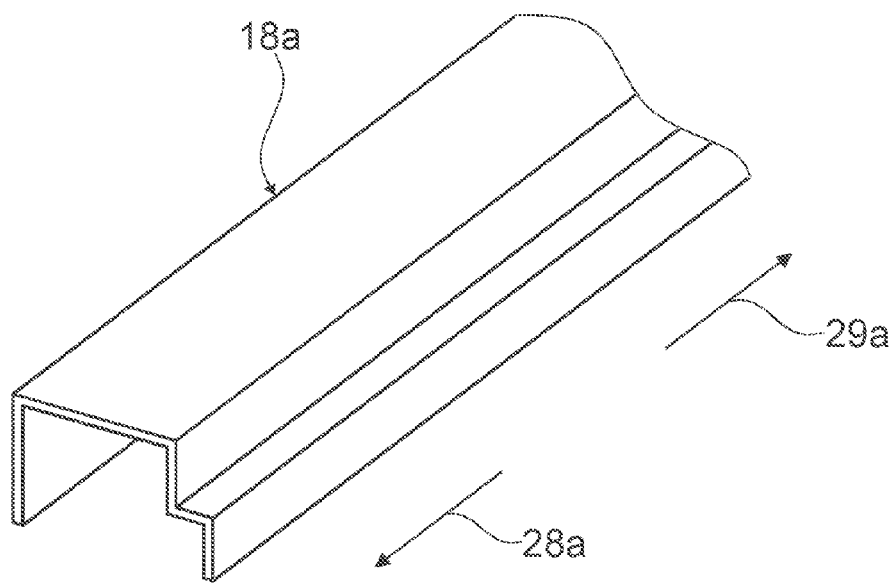

FIG. 5 shows a portion of the cover unit 14a which comprises a second cover element 18a in a perspective view. The second cover element 18a and the first cover element 16a are movably coupled to each other by means of the guiding unit 10a (see FIG. 6). The second cover element 18a is configured for coupling with the insert 38a. The second cover element 18a has a first wall section 66a. By means of the first wall section 66a, the second cover element 18a is coupled to the insert 38a. Alternatively the second cover element 18a may be integrally implemented with the insert 38a. The second cover element 18a is coupled to the movable guiding element 32a. The second cover element 18a has a second wall section 64a. By means of the second wall section 64a, the second cover element 18a is coupled to the guiding unit 10a, in particular to the movable guiding element 32a. The first wall section 66a and the second wall section 64a of the second cover element 18a are arranged opposite each other.

Viewed along the extraction direction 28a, the second cover element 18a encloses the guiding unit 10a from at least one side 20a. Additionally or alternatively the first cover element 16a may enclose the guiding unit 10a from three sides 20a, 22a, 26a. The second cover element 18a has a cross-section which is at least substantially u-shaped. The second cover element 18a comprises three consecutive wall sections 64a, 65a, 66a. The consecutive wall sections 64a, 65a, 66a are straight. The consecutive wall sections 64a, 65a, 66a are connected to each other. Respectively two consecutive wall sections 64a, 65a, 66a include an angle of 90°.

The second cover element 18a at least partly engages into the first cover element 16a from at least one side 20a at least in the fully contracted state. The first cover element 16a delimits a receiving region 68a into which the second cover element 18a at least partly extends. The receiving region 68a is delimited at least by the wall sections 40a and 44a of the first cover element 16a. The second wall section 64a of the second cover element 18a extends into the receiving region 68a. Viewed in the extraction direction 28a, the second wall section 64a of the second cover element 18a is arranged in between the wall sections 40a, 44a of the first cover element 16a.

Viewed at least substantially perpendicularly to the extraction direction 28a, the first cover element 16a and the second cover element 18a at least mostly overlap in the fully contracted state (see FIG. 2). Viewed at least substantially perpendicular to the extraction direction 28a, the first cover element 16a and the second cover element 18a at most minorly overlap in the fully extracted state (see FIG. 3). The wall section 64a of the second cover element 18a overlaps with the wall section 44a of the first cover element 16a. The wall section 65a of the second cover element 18a overlaps with the wall section 43a of the first cover element. The wall section 66a of the second cover element 18a overlaps with the wall section 42a of the first cover element 16a. In the fully extracted state, the first cover element 16a and the second cover element 18a together at least mostly cover the guiding unit 10a from the first side 20a.

FIGS. 7 to 10 show further exemplary embodiments of the invention. The following description is substantially limited to the differences between the exemplary embodiments, wherein regarding structural elements, features and functions that remain the same the description of the other exemplary embodiments, in particular the exemplary embodiment of FIGS. 1 to 6, may be referred to. For distinguishing the exemplary embodiments, the letter a of the reference numerals in the exemplary embodiment of FIGS. 1 to 6 has been substituted by the letters b to e in the reference numerals of the exemplary embodiments of FIGS. 7 to 10. Regarding structural elements having the same denomination, in particular regarding structural elements having the same reference numerals, principally the drawing and/or the description of the other exemplary embodiments, in particular of the exemplary embodiment of FIGS. 1 to 6, may be referred to.

Figure 7:
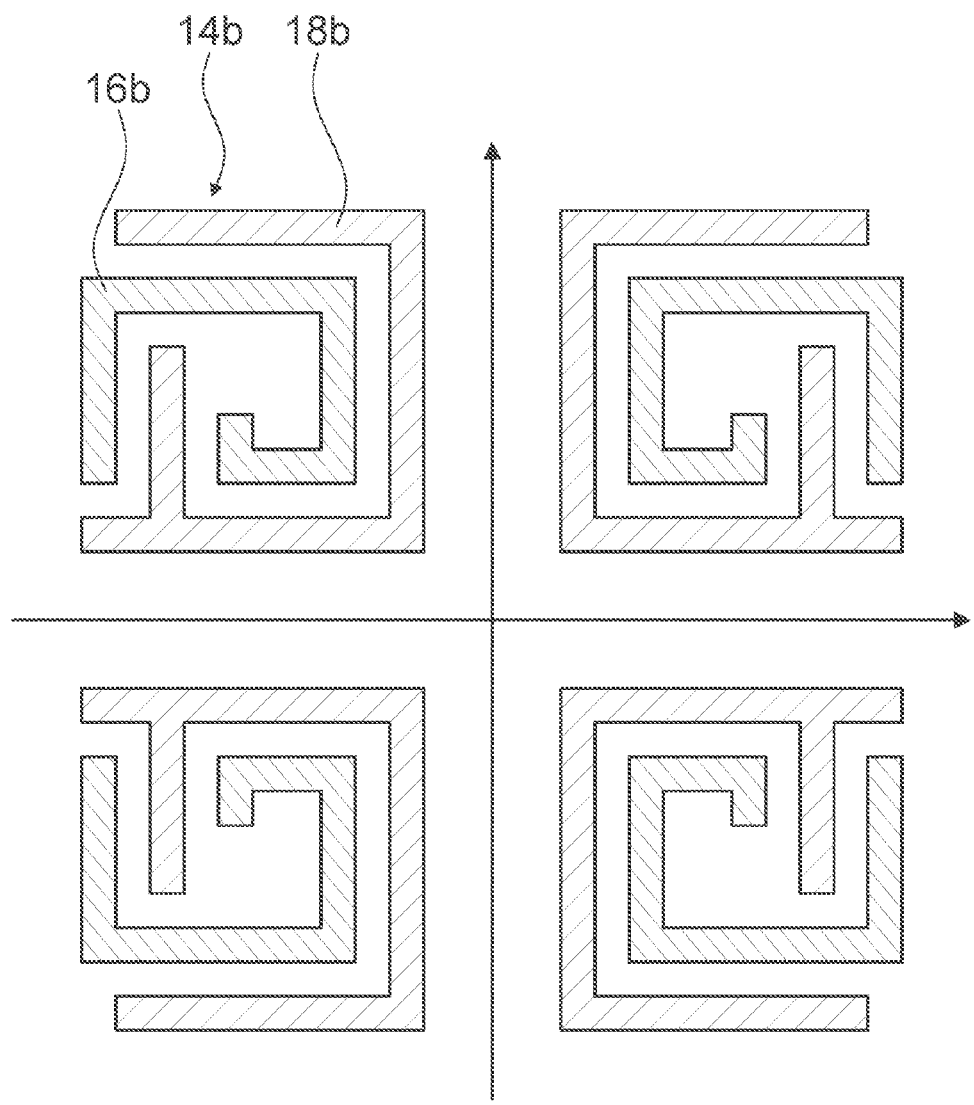
Figure 8:
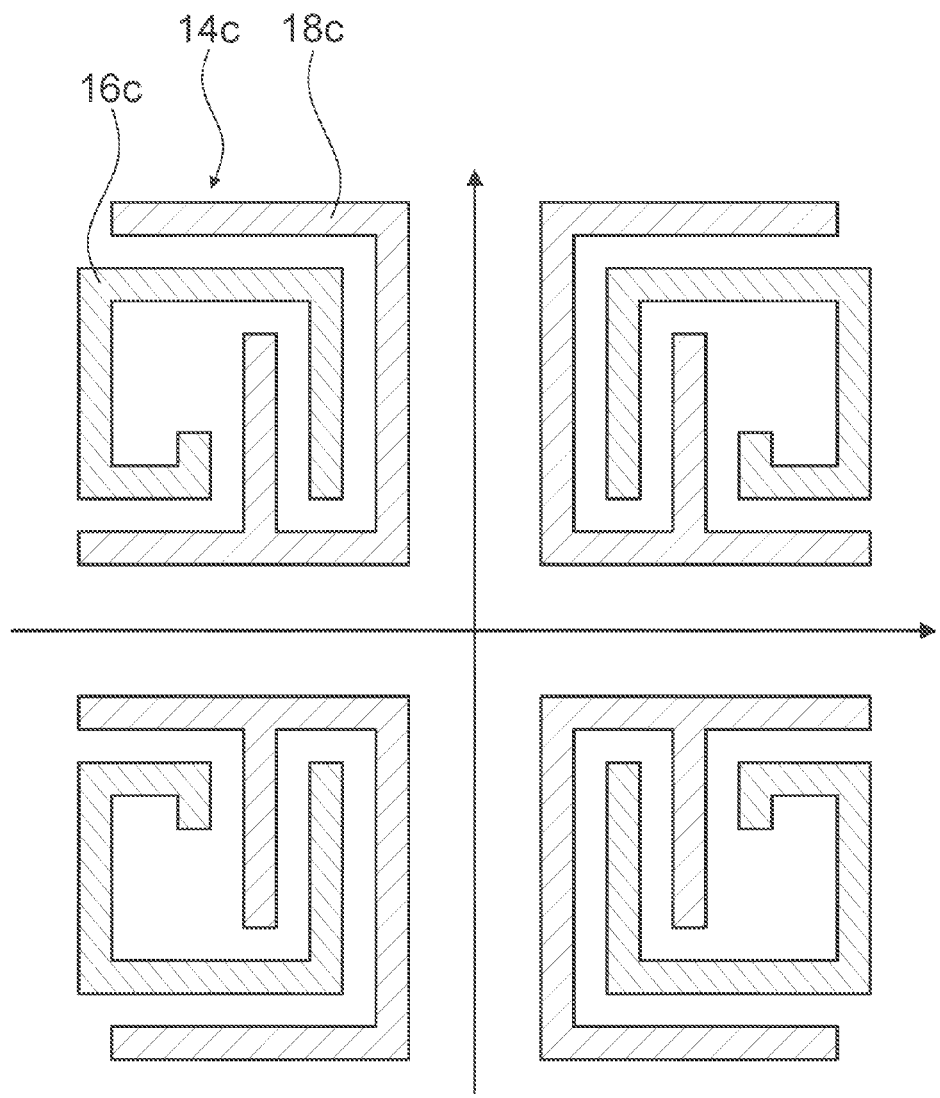
Figure 9:
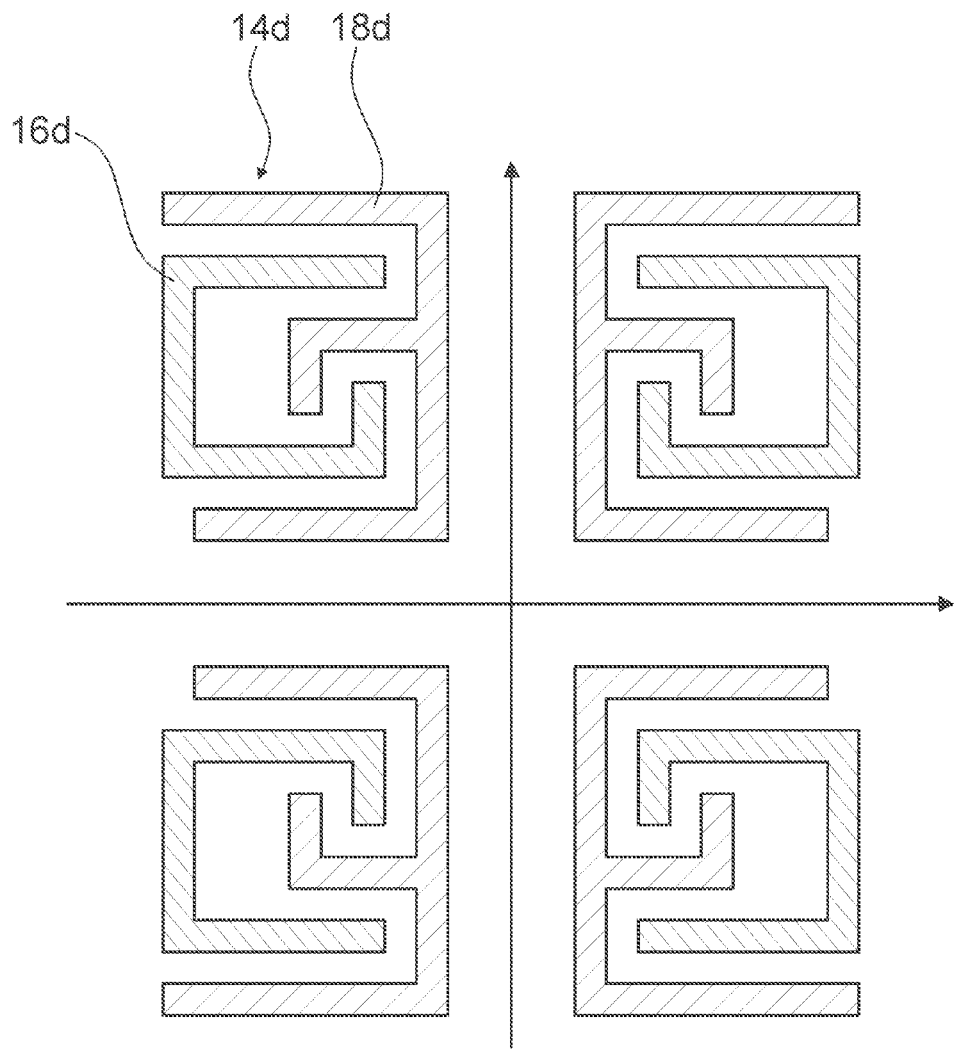

FIGS. 7 to 9 show a portion of a further home appliance device comprising a cover unit 14b-d. The exemplary embodiments of FIGS. 7 to 9 differ from the preceding exemplary embodiment at least substantially by their respective implementations of a first cover element 16b-d and a second cover element 18b-d. The different implementations may in particular be transferred into each other by reflections across the marked axis. In some cases of these embodiments the properties of the first cover element and the second cover element are swapped, such that the second cover element may be configured to be coupled to an inner liner, while the first cover element is configured to be coupled to an insert. Furthermore, in some cases the first cover element 16b-d may be configured to be coupled to a movable guiding element, while the second cover element 18b-d may be configured to be coupled to a stationary guiding element.

Figure 10:
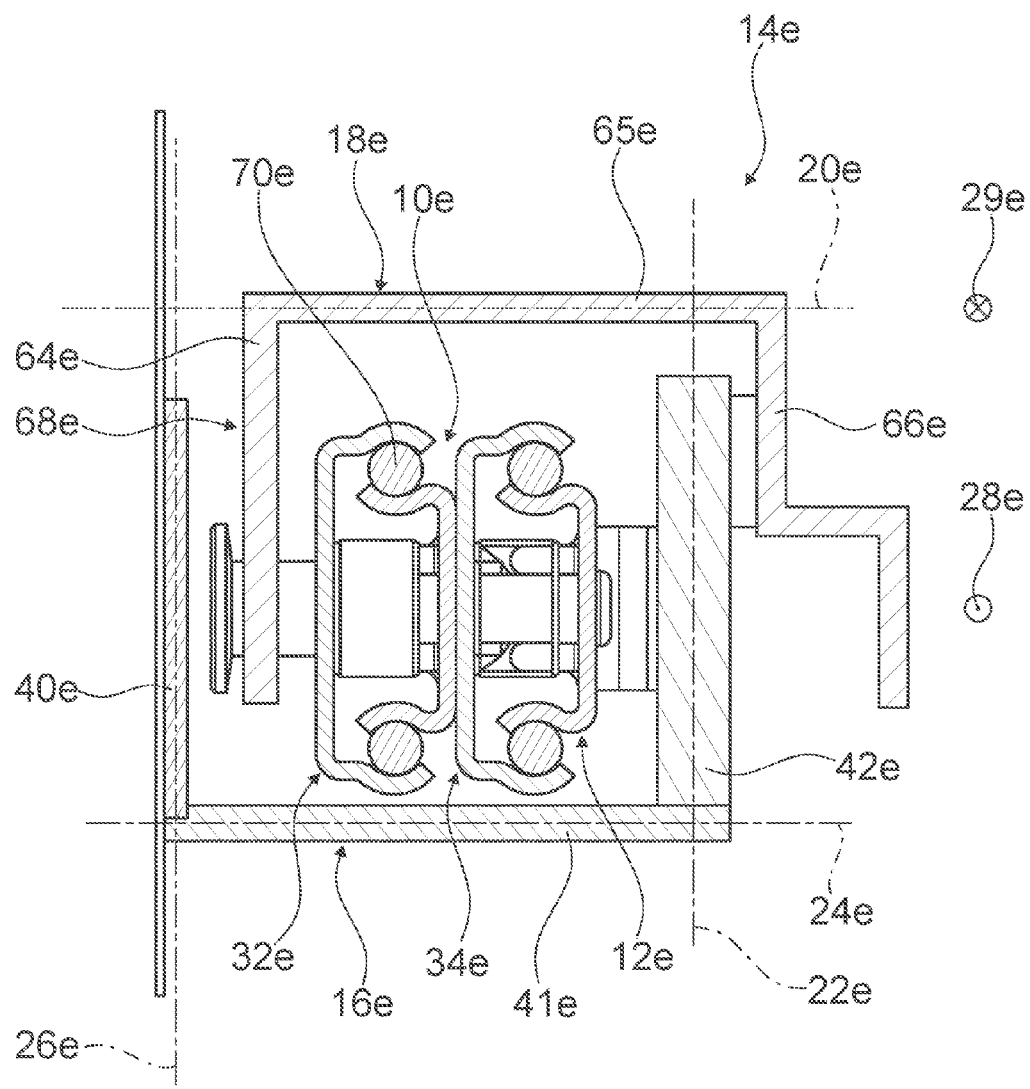

FIG. 10 shows a portion of another exemplary embodiment of a home appliance device, comprising a cover unit 14e. The cover unit 14e at least mostly covers a stationary guiding element 12e at least in the fully extracted state. Viewed along an extraction direction 28e, a first cover element 16e covers and/or encloses a guiding unit 10e, in particular the stationary guiding element 12a, at least in the fully extracted state, from at least three sides 22e, 24e, 26e, namely a first side 22e, a second side 24e, and a third side 26e (see FIG. 6). The first side 22e is at least substantially perpendicular to the horizontal plane 46e. The second side 24e is at least substantially parallel to a horizontal plane 46e. The third side 26e is at least substantially perpendicular to the horizontal plane 46e. The first side 22e and the third side 26e are situated opposite each other.

The first cover element 16e has a cross-section which is at least substantially u-shaped. The first cover element 16e comprises three consecutive wall sections 40e, 41e, 42e. The consecutive wall sections 40e, 41e, 42e are straight. The consecutive wall sections 40e, 41e, 42e are connected to each other. Respectively two consecutive wall sections 40e, 41e, 42e include an angle of 90°.

A second cover element 18e at least partly engages into the first cover element 16e from at least one side 20e, in particular a fourth side 20e, at least in the fully contracted state. The first cover element 16e delimits a receiving region 68e into which the second cover element 18e at least partly extends. The receiving region 68e is delimited at least by the wall sections 40e and 42e of the first cover element 16e. A second wall section 64e of the second cover element 18e extends into the receiving region 68e. Viewed in the extraction direction 28e, the second wall section 64e of the second cover element 18e is arranged in between the wall sections 40e, 42e of the first cover element 16a.

The following is a summary list of reference numerals and the corresponding structure used in the above description of the invention:

10 guiding unit
12 stationary guiding element
14 cover unit
16 first cover element
18 second cover element
20 fourth side
22 first side
24 second side
26 third side
28 extraction direction
29 contraction direction
32 movable guiding element
34 further movable guiding element
36 inner liner
38 insert
40 wall section
41 wall section
42 wall section
43 wall section
44 wall section
45 home appliance
46 horizontal plane
48 housing
50 storage space
52 wall
54 wall
56 wall
58 wall
60 frame
62 deposit element
64 wall section
65 wall section
66 wall section
68 receiving region
70 bearing element

The invention claimed is:

1. A home appliance device, comprising:
a telescopic guiding unit configured to be convertible at least from a fully contracted state to a fully extracted state and vice versa and having at least one stationary guiding element; and
a cover unit, which at least mostly covers the stationary guiding element at least in the fully extracted state, the cover unit having a first cover element and a second cover element, which are movably coupled to each other by the guiding unit, the first cover element having a cross section which is at least substantially spiral-shaped.

2. The home appliance device according to claim 1, the first cover element and the second cover element at least partly overlapping in the fully contracted state.

3. The home appliance device according to claim 1, the first cover element and the second cover element at least partly overlapping in the fully extracted state.

4. The home appliance device according to claim 1, the second cover element at least partly enclosing the first cover element from at least one side in the fully contracted state.

5. The home appliance device according to claim 1, the second cover element at least partly engaging into the first cover element from at least one side in the fully contracted state.

6. The home appliance device according to claim 1, the first cover element and the second cover element together at least mostly covering the guiding unit from at least one side in the fully extracted state.

7. The home appliance device according to claim 1, the first cover element enclosing the guiding unit from at least three sides, viewed along an extraction direction of the guiding unit.

8. The home appliance device according to claim 1, the second cover element enclosing the guiding unit from at least one side, viewed along an extraction direction of the guiding unit.

9. The home appliance device according to claim 1, the guiding unit comprising at least one movable guiding element, which is movably coupled to the stationary guiding element, wherein the first cover element is coupled to the stationary guiding element and the second cover element is coupled to the movable guiding element.

10. The home appliance device according to claim 1, the first cover element being configured for coupling with an inner liner and the second cover element being configured for coupling with an insert.

11. The home appliance device according to claim 1, the first cover element having a first wall section, by means of which the first cover element is configured to be coupled to the inner liner, and having a second wall section, by means of which the first cover element is coupled to the guiding unit, wherein the first wall section and the second wall section are arranged opposite each other.

12. The home appliance device according to claim 1, further comprising an insert, which is embodied as a bottle holder and is coupled to the guiding unit.

13. The home appliance device according to claim 1, configured as a home appliance chiller device.

14. A home appliance, in particular a home chiller appliance, comprising at least one home appliance device according to claim 1.

15. The home appliance according to claim 14, configured as a home appliance chiller device.

* * * * *